United States Patent [19]

Nakai et al.

[11] 3,986,095

[45] Oct. 12, 1976

[54] APPARATUS FOR RECHARGING A SELF-RUNNING VEHICLE FOR LOADING AND/OR UNLOADING A WORKING MACHINE, EMPLOYING AS A POWER SOURCE A STORAGE BATTERY

[75] Inventors: Saburo Nakai; Nobuyuki Koyama, both of Tokyo, Japan

[73] Assignee: The Japan Tobacco & Salt Public Corporation, Tokyo, Japan

[22] Filed: Sept. 2, 1975

[21] Appl. No.: 609,681

[30] Foreign Application Priority Data

Aug. 30, 1974 Japan ............................... 49-98908

[52] U.S. Cl. ........................................ 320/2; 180/2; 180/65 R; 339/10; 307/80

[51] Int. Cl.$^2$ ...................... B60L 9/00; B60L 11/18; H01M 10/46

[58] Field of Search .............. 180/2, 65; 200/51.09; 320/2, 56, 61, 47; 318/139; 339/1, 9, 10, 42; 307/80, 85

[56] References Cited

UNITED STATES PATENTS

| | | | |
|---|---|---|---|
| 691,473 | 1/1902 | Limb | 320/2 X |
| 2,832,177 | 4/1958 | Mueller | 320/2 UX |
| 3,136,435 | 6/1964 | Vickers | 180/2 UX |
| 3,169,733 | 2/1965 | Barrett, Jr. | 320/47 X |
| 3,603,860 | 9/1971 | Johnson | 320/2 |

*Primary Examiner*—Robert J. Hickey
*Attorney, Agent, or Firm*—Armstrong, Nikaido & Wegner

[57] ABSTRACT

An apparatus for recharging a storage battery employed in a self-running vehicle, for example, a cart, a carrier or the like for transporting loads. The recharging is carried out without interrupting the loading, unloading or transporting work. A plug means and a socket means are securely connected by some specific means and never disconnected from each other during the recharging process. According to the present invention, there can be obtained a high recharging effect and elimination of loss of time.

4 Claims, 7 Drawing Figures

APPARATUS FOR RECHARGING A SELF-RUNNING VEHICLE FOR LOADING AND/OR UNLOADING A WORKING MACHINE, EMPLOYING AS A POWER SOURCE A STORAGE BATTERY

BACKGROUND OF THE INVENTION

The invention relates to a recharging apparatus for a self-running vehicle (hereinafter sometimes referred to only as "vehicle") for loading and/or unloading, transporting etc., having a storage battery as a power source, and more particularly to an apparatus for recharging a storage battery of such a vehicle, for example, a carrier, a cart or the like for transporting loads all while the vehicle is stopped, or going slow, or intermittently advancing to be loaded or unloaded along a predetermined course or track.

Recently, self-running vehicles have been very frequently used for carrying products from one stage to another throughout a manufacturing process. Self-running vehicles driven by a storage battery are used more often than any other type. However it has been required that either such vehicles having storage batteries as their power source be guided to a specific recharging chamber where the battery is to be connected to a recharging means, or that the used battery be replaced by another fully charged, storage battery. Therefore, during the recharging operation, the vehicles must be out of the usual transporting course and, therefore, operations must be interrupted, leading to a waste of time.

Since the vehicle is to be used for carrying some products, it is naturally desirable that the storage battery to be used therewith be of small size and high efficiency. Further it is advantageous that the battery in the vehicle be recharged to an extent sufficient for driving the vehicle during loading or unloading operation without being taken out of the transporting course.

It is an object of the present invention to provide an apparatus for recharging the storage battery of a self-running vehicle during loading or unloading operation.

It is another object of the present invention to provide an apparatus for recharging the storage battery of a self-running vehicle, which enables the vehicle to move slowly or intermittently while carrying therewith a plug means under recharge.

It is a further object of the present invention to provide a recharging apparatus, in which a plug means and a socket means are connected in such a manner that the plug means is prevented from slipping out of the socket means by a locking means during the recharging process.

It is a still further object of the present invention to provide a recharging apparatus which is sure in operation while avoiding a poor contact in a closed circuit.

SUMMARY OF THE INVENTION

Essentially, according to the present invention, there is provided an apparatus for recharging a self-running vehicle for loading and/or unloading a working machine, employing as a power source a storage battery, comprising a socket means attached to the self-running vehicle; a plug means adapted to be connected with said socket means; a rail adapted to move up and down to connect and disconnect said socket means with said plug means, respectively, with said plug means being adapted to reciprocating travel on said rail; an actuating means for actuating said rail to move up and down; a detecting means for detecting arrival of the self-running vehicle at a predetermined position to start recharging and for transmitting a signal; a signal receiving means for receiving said signal to operate said actuating means to move said rail up to connect said socket means with said plug means; a recharging means connected to said plug means for recharging said storage battery; said signal receiving means being adapted to receive a signal from another detecting means for detecting the completion of the loading and/or unloading after recharging and to operate said actuating means to move said rail down to disconnect said plug means from said socket means; and a means for returning said plug means to a starting position; said plug means, said rail, said actuating means, said detecting means and said means for returning the plug means all being attached to a frame connected to said working machine.

BRIEF DESCRIPTION OF THE INVENTION

The present invention will be better understood from the following description taken in connection with the accompanying drawings in which.

DETAILED DESCRIPTION OF THE INVENTION

Figure 1:
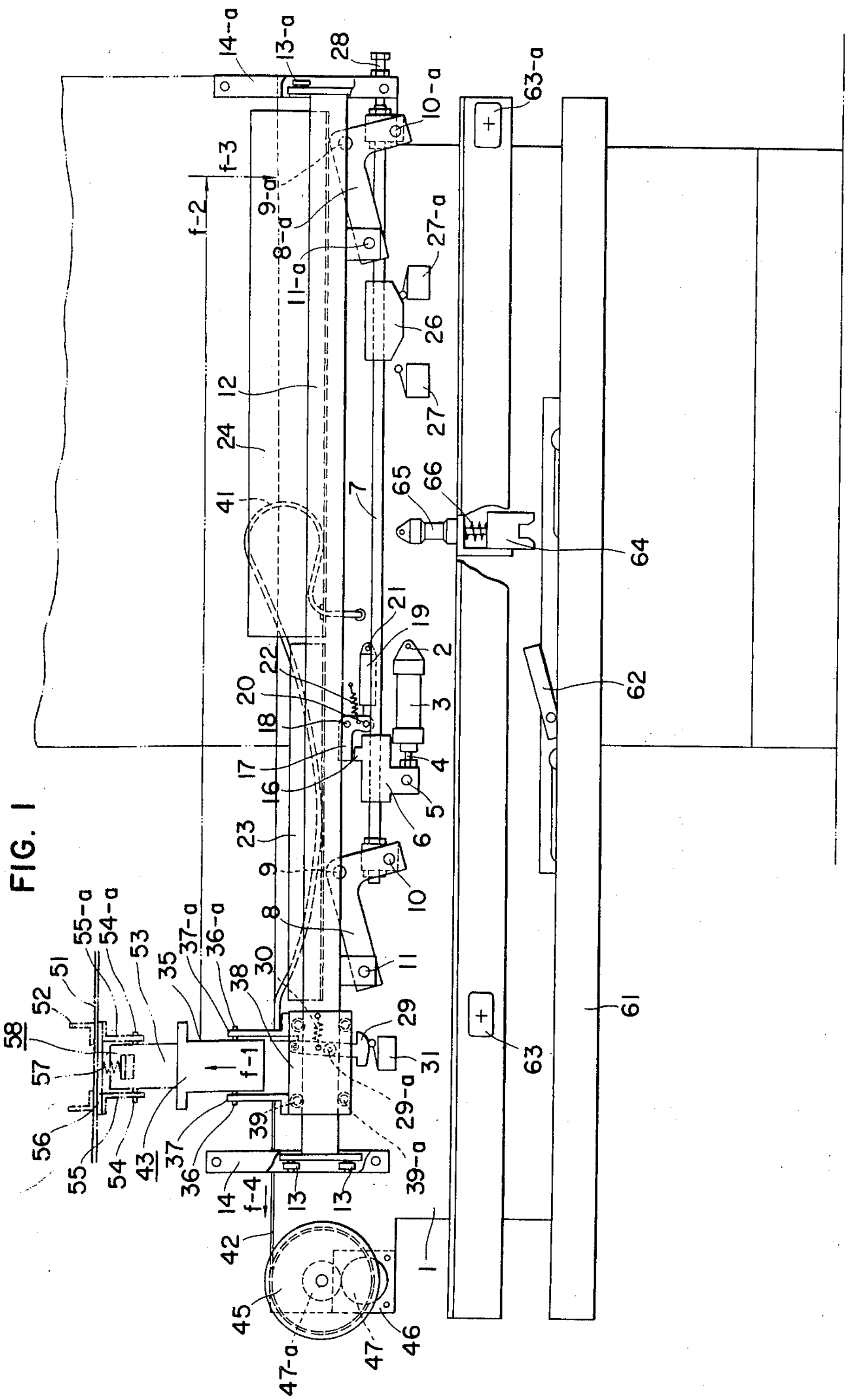
FIG. 1 is a side view, partly broken away, of a recharging apparatus of the present invention.

Referring to the drawings, there is described one embodiment of the present invention.

In FIG. 1 an air cylinder 3 is attached to a frame (or an upright wall) 1 through a pivot 2. The tip end of a piston rod 4 is connected to an arm 6 by means of a pin 5. Said arm 6 is fixed to a rod 7. Cross arms 8 and **8-*a* are pivotally supported on the frame 1 through pivots 9 and 9-*a* which are fixed to the frame 1, respectively. Each of said cross arms 8 and 8-*a* is pivotally connected at its one end to the rod 7 by pivots 10 and 10-*a*, and at the other end to a rail 12 by pivots 11 and 11-*a*, respectively. The distance between the pivot 9 and 9-*a*, the length of the rod 7 between the pivots 10 and 10-*a*, and the distance between the pivots 11 and 11-*a* are all equal to one another. Further, the distance between the pivot 9 and the pivot 10 is equal to that between the pivot 9-*a* and the pivot 10-*a*, and the distance between the pivot 9 and the pivot 11 is equal to that between the pivot 9-*a* and the pivot 11-*a*. Namely, the cross arm 8 is congruent with the cross arm 8-*a*. Due to such structure, the lateral motion of the rod 7 through the arm 6 is converted to the vertical motion of the rail 12. Guide members 14 and 14-*a* are fixed to the frame 1 and rollers 13 and 13-*a* connected to both ends of the rail 12 respectively, are guided in said guide members 14 and 141*a*, respectively so that the rail 12 may smoothly move in the vertical direction. The length of the rail 12** is determined based upon the distance the vehicle covers while continuing the transporting operation. A stop means 28 is screwedly inserted in a secured fashion into the guide member 14-*a* and is adapted to abut against the end of the rail 12.

Figure 3:
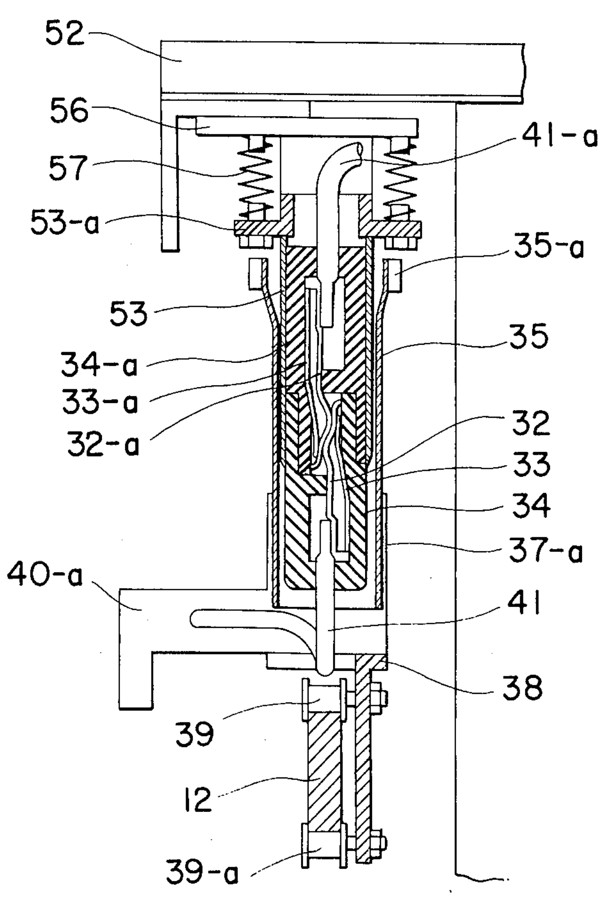
FIG. 3 is a sectional view of a socket means inserted into a plug means.
Figure 4:
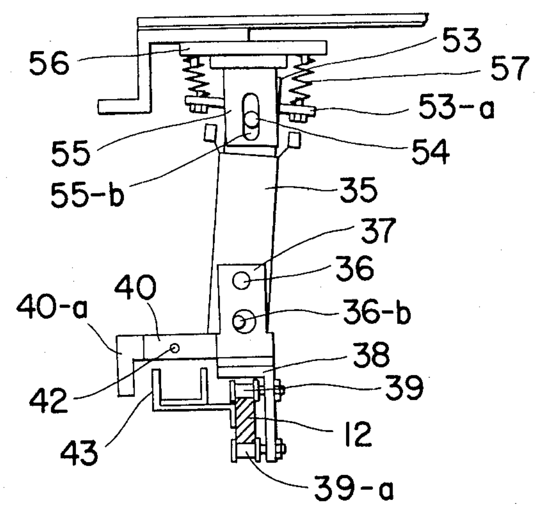
FIG. 4 is an elevation view illustrating another state of connection of a socket means with a plug means.

Referring to FIG. 3, a terminal 32 is connected in a secured manner to one end of a cord 41 and inserted in a protective case 34 with a leaf spring 33. The plug consists of a terminal 32, a leaf spring 33 and a protective case 34. An outer case 35 has a plug fixed therein, and an upper edge portion 35-*a* thereof is slightly outwardly opened so that a socket means (which will be explained hereinafter) is easily guided thereinto. Referring to FIG. 3 and FIG. 4 the outer case 35 is supported by support means 37 and 37-*a* through pins 36 and 36-*a* which are fixed to said outer case, respectively. A pin 36-*b* is also fixed to the outer case 35 and inserted into the support means 37-*a*. The pin 36-*b* is employed for restricting the swing range of the plug, which may swing at the pins 36 and 36-*a*, within the range in which the plug is easily and securely connected with the socket means. The size of the space formed in the support means 36-*a* to receive the pin 36-*b* is determined so as to correspond to the above limited range.

The support means 37 and 37-*a* are fixed to a carriage 38 at both sides thereof, rspectively. Said carriage 38 is adapted to slide over the rail 12 by means of two pairs of rollers 39 and 39-*a* provided at an upper and a lower portion of the carriage as can be seen from FIG. 1. The cord 41 extending from the plug is supported by a holding means 40-*a* fixed to the support means 37-*a*, and is adapted to be guided through a guide member 23 attached to the rail 12 and a guide member 24 attached to the frame 1. The cord 41 is fixed at its intermediate portion to the frame 1 at a position corresponding to the substantial center of the rail 12 and the tip end of the cord is connected to a recharging means 73. The length of the cord 41 from the point where the cord is fixed to the holding means 40-*a* to the point where it is fixed to the frame 1 is made substantially equal to the sum of half of the distance the plug covers (from a position *f*-1 to a position *f*-3) and the length of an arc portion or slack portion of the cord, which slack is necessary for the cord to turn in the guide members. The length of the guide member 23 corresponds to the distance between the position *f*-1 and the center of the rail 12, and the length of the guide member 24 corresponds to the distance between the center of the rail and the position *f*-3. As the plug moves from the position *f*-1 towards the position *f*-3, the arc portion of the cord 41 also moves to the right in FIG. 1, and when the plug has passed the center of the rail 12, the cord is guided only by the guide member 24.

A plug means 43 mainly consists of the plug, support means 37 and 37-*a*, an outer case 35, a carriage 38 and a cord 41.

A rope 42 is connected at its one end to a hold means 40 holding the plug means 43 and is connected at the other end thereof to a pulley 45. The length of the rope 42 is substantially equal to the distance between the pulley 45 and the position *f*-3. A motor 46 is adapted to drive the pulley 45 through a reduction gear 46-*a*, a gear 47 and a gear 47-*a*. A clutch 48 is provided between the pulley 45 and the gear 47-*a*.

Figure 5:
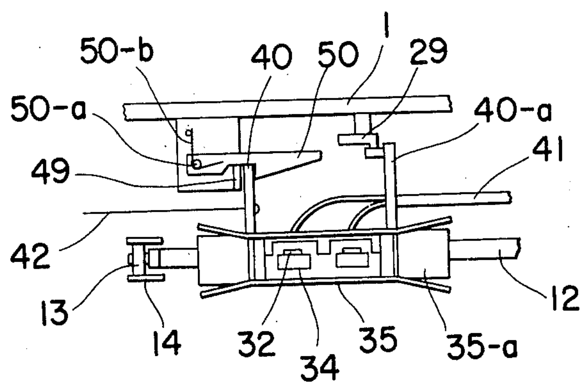
FIG. 5 is a plan view illustrating how to fix a plug means at a position where a socket means is to be inserted into the plug means.

A terminal 32-*a* is fixed to one end of a cord 41-*a* and inserted into a protective case 34-*a* together with a leaf spring 33-*a*. A socket means 58 consists of a terminal 32-*a*, a leaf spring 33-*a* and a protective case 34-*a* and an outer case 53. The protective case 34-*a* with the terminal 32-*a* and the leaf spring 33-*a* is inserted in a secured manner into the outer case 53, which is of such dimension that it can be inserted into the outer case 35 of the plug means through the upper edge portion 35-*a*. The outer case 53 is supported by pins 54 and 54-*a* fixed to said outer case 53 and inserted into elongated holes 55-*b* formed in support means 55 and 55-*a*, respectively. The support means 55 and 55-*a* are fixed to a holding plate 56, and said holding plate 56 is fixed to one side of the vehicle below a tray guide 52 connected to the working machine. Between said holding plate 56 and a receiving plate 53-*a* fixed to the outer case 53 there is provided a compression spring 57. The cord 41-*a* fixed to the socket means 58 is connected to a storage battery 79 installed in the self-running vehicle 51. In FIG. 1, the character *f*-1 shows a position where the plug means 43 is to be pushed up in the direction shown by an arrow ↑ to be connected with the socket means 58. For this purpose, it is necessary to precisely fix the plug means and the socket means at the proper predetermined positions, respectively. When the plug means 43 has been pulled by the rope 42 from the position *f*-3 towards the direction shown by an arrow *f*-4 along the rail 12 and has returned to the position *f*-1 (a starting position for recharging), a holding means 40 fixed to the support means 37 is put between a stop means 49 and a pawl 50 in the locked relation, whereby the plug means is fixed at the position *f*-1. The pawl 50 is pivotally connected at a pivot 50-*a* to some support means fixed to the frame 1 and always abuts the stop means 49 due to the action of a spring 50-*b* (Refer to FIG. 5).

Figure 2:
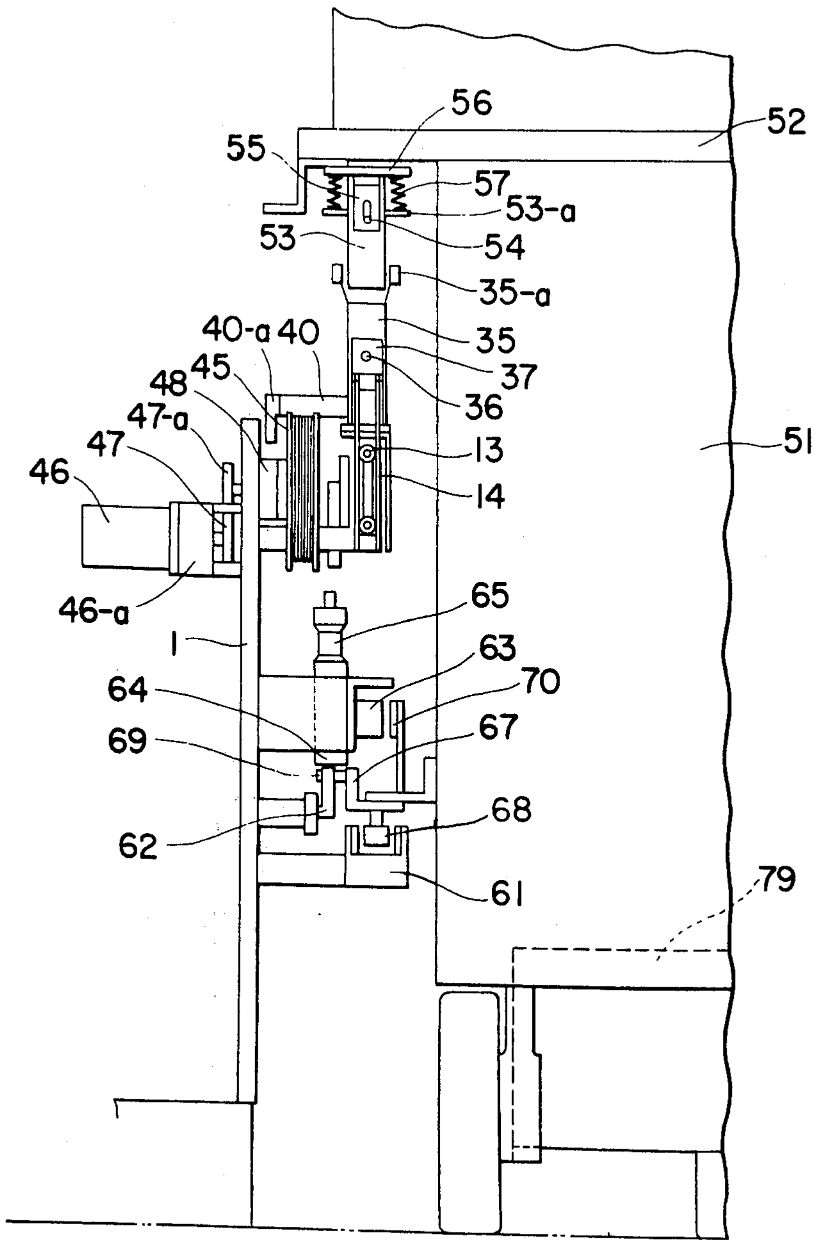
FIG. 2 is an elevational view of a principal part of the invention illustrating the relationship between the recharging apparatus and a self-running vehicle, taken from the rear side of the vehicle.

Referring to FIG. 2, at a lower portion of one side (facing the frame 1) of the vehicle 51 there is fixed an angle 67 with a roller 68 and a pin 69. A guide rail 61, a pawl 62, a fork 64 and detectors 63 and 63-*a* are all attached to the frame 1. Just when the roller 68 is inserted into a groove in the guide rail 61, the vehicle is at a right position with relation to the frame 1 and the outer case 35 of the plug means which has been already fixed at the position *f*-1 is positioned right under the outer case 53 of the socket means. As the vehicle advances slowly, the pawl 62 catches the pin 69 to carry the pin 69 towards the fork 64. The fork 64 holds the pin 69 by the action of a compression spring 66 connected to an air cylinder 65. When air is supplied into the air cylinder 65, the fork 64 is pulled up and the engagement between the fork 64 and the pin 69 is released thereby to set the auto-vehicle free. The pawl 62 is helpful only in the forward movement of the vehicle.

The detectors 63 and 63-*a* are adapted to detect positions of the auto-vehicle and supply signals for connection and disconnection of the plug means when a magnetic substance 70 fixed to one side of the vehicle is just opposite to said detectors, respectively.

Figure 6:
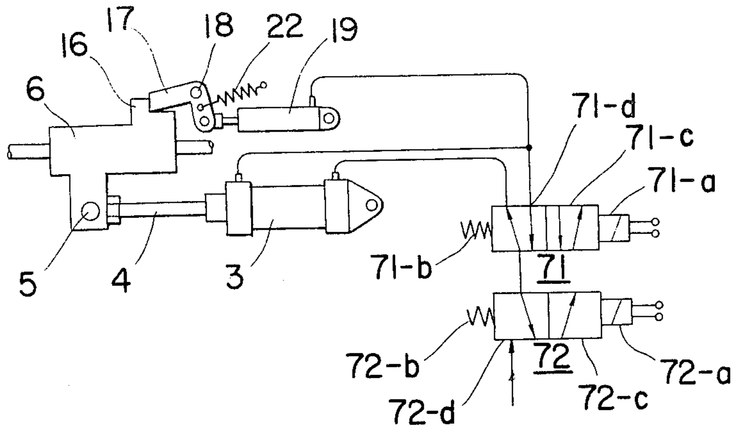
FIG. 6 is a plumbing diagram illustrating the operation of air cylinders.
Figure 7:
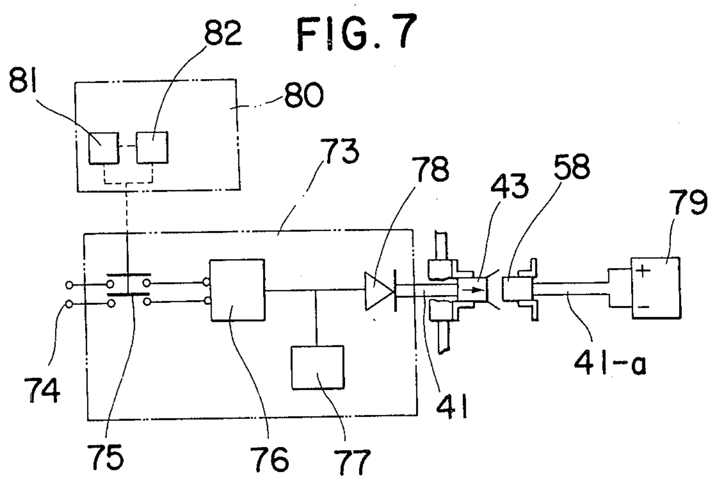
FIG. 7 is a circuit diagram for the recharging.

Referring to FIG. 6, the air cylinder 3 and an air cylinder 19 are actuated by air pressure through valves 71 and 72 operated by solenoids 71-*a*, and 72-*a*, respectively, thereby to actuate the piston rod 4 and a pawl 17. When a solenoid 71-*a* is energized, the valve 71 takes a state as shown by the numeral 71-*c*. At this instance the piston rod 4 moves to the right in the drawing and the engagement of a cutout portion 16 with the pawl 17 is released. The pawl 17 is adapted to pivot at a pin 18. When the solenoid 71-*a* is de-energized, the valve 71 assumes a condition as shown by the numeral 71-*d* due to spring 71-*b*. At this time, the piston rod 4 moves to the left and, as the air in the air cylinder 19 is exhausted through the valve 71, the tip end of the pawl 17 is lowered and engaged with the cutout portion 16 before the completion of the leftward movement of the piston rod 4. This engagement of the cutout portion 16 with the pawl 17 prevents the arm 6 from moving to the right, which prevents the plug means from slipping off of the socket means. The valve 72 assumes the condition at 72-*c* when the solenoid 72-*a* is energized, whereby air is supplied to the valve 71. When the solenoid 72-*a* is de-energized, the valve 72 assumes the condition at 72-*d* due to spring 72-*b*, whereby air is shut out and the air in the air cylinders 3 and 19 is exhausted from the valve 72.

A charging means 73 consists of a transformer 76, a voltage regulator 77, a rectifier 78, a power supply 74 and a switch 75. The recharging means 73 is connected to the terminal 32 of the plug means through the cord 41 and fixed to a proper member of a selected machine, such as, a filter rod manufacturing machine, a packing machine, etc., to which the frame is connected. A voltage suitable for the recharging is obtained through the transformer 76, and the voltage can be varied by the voltage regulator 77 according to the progress of the recharging, thereby obtaining a good recharging effect. An alternating current (A.C.) from the power supply 74 is converted into a direct current (D.C.) through the rectifier 78. The switch 75 is adapted to be controlled by timers 81 and 82 which are provided on a control board 80. The timer 81 works from the start of the recharging and is adapted to make the switch 75 close about 2 to 3 seconds after the socket means has been inserted into the plug means. The interval of the above 2 to 3 seconds is necessary, because the height of the socket means is not always constant due to certain factors such as the condition of the floor surface the self-running vehicle travels, the condition of the vehicle itself, etc., and therefore it may take a few seconds for the plug means to be completely inserted into the socket means after a detecting means 27 has begun operating. The timer 82 operates to terminate the recharging and is adapted to open the switch 75 according to the predetermined time which has been set in view of the actual recharging time which is within the period required for the transporting, loading or unloading operation.

The valves 71 and 72 are employed to switch over an air circuit to the air cylinders 3 and 19. When the plug means is disconnected from the socket means (as shown in FIG. 1), the solenoid 71-*a* and 72-*a* are both in de-energized states and the valves 71 and 72 make air circuits as shown by the numerals 71-*c* and 72-*c*, respectively. Detecting means 27 and 27-*a* are adapted to be actuated by a cam 26 fixed to the rod 7, and a detecting means 31 is adapted to be actuated by the hold means 40-*a* fixed to the support means 37-*a* through a cam 29 pivotally connected to the frame 1 at a pivot 29-*a*.

In this embodiment, signals for actuating each means are transmitted through customary circuits.

Now the operation of the present apparatus will be explained in detail. When the plug means and the socket means are fixed at the position *f*-1 through the mechanism as explained hereinbefore, the detecting means 31 and the detecting means 63 begin to operate to open the circuit for the solenoid 71-*a*. The valve 71 assumes the condition at 71-*d* due to the action of the spring 71-*b*, thereby moving the piston rod 4 to the left in FIG. 1. As the piston rod 4 moves to the left, the rail 12 moves upwards through the cross arms 8 and 8-*a*. Therefore, the plug means 43 also moves upwards so as to be connected with the socket means 58. As shown in FIG. 4, it may sometimes happen that the plug means is out of plumb with the socket means. Accordingly, the plug means can lean somewhat at the pins 36 and 36-*a*, and the socket means can also lean somewhat at pins 54 and 54-*a*, thereby enabling the plug means and the socket means to be completely connected with each other. The contact faces of the terminals 32 and 32-*a* are tightly pressed by means of the leaf springs 33 and 33-*a*.

When the rail 12 travels upwards, the detecting means 27 begins to operate to make the circuit for the timer 81. After a predetermined time (about 2 to 3 seconds as explained hereinbefore) the switch 75 of the recharging means 73 is closed through the timer 81 and the storage battery 79 begins to be recharged through the power supply 74. At the same time, the timer 81 works to de-energize the solenoid 72-*a*. The valve 72 assumes the condition at 72-*d* due to the action of spring 72-*b*, thereby releasing the air from the air cylinder 3. The rail travels downward and the rod 7 tends to move to the right due to the weight of the rail 12, but is prevented by means of the pawl 17 engaged with the cutout portion 16 of the arm 6. The plug means and the socket means are connected in a pressed manner with each other by the compression spring 57, and therefore the tight connection of terminal 32 with terminal 32-*a* is continuously maintained. In case the floor surface on which the self-running vehicle runs is uneven, if the air is not removed from the air cylinder 3, there is a danger that due to the air pressure, the socket means may push down the rail 12 with the result that excessive force may be imposed upon the plug means, the socket means and the link mechanism thereof. Therefore, it is necessary for the air to be released from the air cylinder 3 in order to permit relief, so that the plug means may slide over the socket means to a small degree according to a slight jolting of the vehicle caused by unevenness of the floor. Due to the elongated hole 55-*b* formed in the support means 55, the vertical motion of the vehicle has no influence upon the connection of the plug means with the socket means. During the loading or unloading process, the vehicle with the socket means connected with the plug means moves in the direction shown by an arrow *f*-2, and at the final step of the operation the plug means and the socket means are at the position *f*-3. At this instance, the detector 63-*a* detects magnetic flux from the magnetic substance 70 fixed to the vehicle. On the other hand, when the timer 82 indicates the predetermined time at which the recharging is to be stopped, the switch 75 is opened to stop recharging the battery 79. At the same time the detecting means 63-*a* supplies a signal to energize the solenoid 72-*a*. The valve 72 assumes the condition at 72-*c* and air is supplied into the air cylinder 3. When the last package, etc. has been dealt with, the solenoid 71-*a* is energized by a signal from a detecting means (not shown) provided on the working machine. The valve 71 assumes the condition at 71-*c*, and the piston rod 4 moves to the right in FIG. 6. The pawl 17 rises through the action of the air cylinder 19 and the locking condition between the arm 6 and the pawl 17 is released. At this time, the rail 12 is lowered, so that the plug means is disconnected from the socket means. In this connection it should be noted that in another embodiment the recharge may start just when the socket means is connected with the plug means and the recharge may terminate just when the socket means is disconnected from the plug means without employing any timer means.

By adjusting the size of the exhaust port of the air cylinder 3, the lowering speed of the rail 12 can be controlled. Further, by adjusting the stop means 28, the extent of the lateral motion of the rod 7, namely the vertical motion of the rail 12 can be controlled. When the rail with the plug means is lowered, the detecting means **27-*a* is actuated through the cam 26 to make a circuit for the motor 46. The pulley 45 is driven by the motor 46 through the reduction gear 46-*a* and the gears 47 and 47-*a*** to wind the rope thereon, thereby to return the plug means from the position *f*-3 to *f*-4 along the rail 12. When the plug means reaches the position *f*-1, the holding means **40-*a* actuates the detecting means 31 through the cam 29, while the holding means 40 is engaged with the pawl 50 and the stop means 49. This engagement is to be released when the plug means is connected with the socket means. By means of the detecting means 31 the circuit for the motor 46 is opened to stop the pulley 45**.

As fully described above, according to the present invention, the storage battery for the self-running vehicle can be recharged in the course of working. Thus the vehicle such as a cart, a truck or the like can continue its work, travelling slowly or intermittently along the side of a manufacturing machine, etc. during the recharging operation. Further, sparking between the plug means and the socket means can be eliminated thereby maintaining the recharging effect.

The recharging time may be optionally set with timers etc. in view of the size of the vehicle, the length of the course travelled and the number of vehicles to be employed through a manufacturing process etc. with controlling stoppage-time along the side of the manufacturing machine etc., waiting-time at a reservior, etc. Therefore, in the present invention, a storage battery in the self-running vehicle can be effectively recharged without interrupting the manufacturing and transporting process thus eliminating a substantial loss of time.

While one embodiment of the invention has been illustrated and described in detail, it is particularly understood that invention is not limited thereto and thereby.

What is claimed is:

1. An apparatus for recharging a self-running vehicle for loading and/or unloading a working machine, employing as a power source a storage battery, comprising a socket means attached to the self-running vehicle; a plug means adapted to be connected with said socket means; a rail adapted to move up and down to connect and disconnect said socket means with said plug means, respectively, said plug means being adapted to reciprocatingly travel on said rail; an actuating means for actuating said rail to move up and down; a detecting means for detecting arrival of the self-running vehicle at a predetermined position to start recharging and for transmitting a signal; a signal receiving means for receiving said signal to operate said actuating means to move said rail up to connect said socket means with said plug means; a recharging means connected to said plug means for recharging said storage battery; said signal receiving means being adapted to receive a signal from another detecting means for detecting the completion of the loading and/or unloading after recharging and to operate said actuating means to move said rail down to disconnect said plug means from said socket means; and a means for returning said plug means to a starting position; said plug means, said rail, said actuating means, said detecting means and said means for returning the plug means being attached to a frame connected to said working machine.

2. An apparatus as claimed in claim 1, wherein said actuating means is a fluid pressure-operated means.

3. An apparatus as claimed in claim 1, wherein said recharging means is adapted to operate through a timer means for recharging the storage battery for a predetermined time.

4. An apparatus as claimed in claim 2, wherein said self-running vehicle is slidably connected with said frame through a roller fixed to said vehicle and a guide rail fixed to said frame.

* * * * *